United States Patent [19]

Laude

[11] Patent Number: 5,991,482

[45] Date of Patent: Nov. 23, 1999

[54] OPTIC WAVELENGTH DISPERSING SYSTEM

[75] Inventor: Jean-Pierre Laude, St-Cyr-la-Rivière par Saclas, France

[73] Assignee: Instruments S.A., Paris, France

[21] Appl. No.: 08/972,243

[22] Filed: Nov. 18, 1997

[30] Foreign Application Priority Data

Jul. 11, 1997 [FR] France .................................. 97 08886

[51] Int. Cl.⁶ .................................................. G02B 6/26
[52] U.S. Cl. .................................. 385/37; 385/33; 385/31; 385/15
[58] Field of Search ................................. 385/24, 36, 37, 385/47, 48, 15, 16, 18, 31, 33

[56] References Cited

U.S. PATENT DOCUMENTS

| | | | |
|---|---|---|---|
| 4,571,024 | 2/1986 | Husbands | 350/96.19 |
| 4,622,662 | 11/1986 | Laude et al. | 370/3 |
| 4,729,641 | 3/1988 | Matsuoka et al. | 350/348 |
| 4,763,969 | 8/1988 | Khoe et al. | 350/96.19 |
| 4,819,224 | 4/1989 | Laude | 370/3 |
| 5,799,118 | 8/1998 | Ogusu et al. | 385/14 |

*Primary Examiner*—John D. Lee
*Assistant Examiner*—Juliana K. Kang
*Attorney, Agent, or Firm*—Nikaido Marmelstein Murray & Oram LLP

[57] ABSTRACT

An optic dispersing system, designed for usage in a wavelength field of a beam, includes a network or grating (1) carried by a support (2) with a dilatation coefficient $\epsilon$. The system suggested is temperature-stabilized. To do so, it contains a front blade or optical element (3), or refractive index $n_1$, transparent in the concerned wavelength field. $\epsilon + 1/n_1 \times dn_1/dt$ is small and, advantageously, $dn_1/dt$ and $\epsilon$ are of opposite signs. This device enables the manufacture of a multiplexer-demultiplexer or a fiber optic wavelength router, which is temperature-stabilized.

21 Claims, 1 Drawing Sheet

OPTIC WAVELENGTH DISPERSING SYSTEM

FIELD OF THE INVENTION

This invention relates to a system or multiplexer-demultiplexer or optic fiber wavelength router, used as a component optic fiber teletransmission unit.

BACKGROUND OF THE INVENTION

Such multiplexers-demultiplexers as described, then progressively perfected, especially in the French patents FR-2.543.768, FR-2.519.148, FR-2.479.981, FR-2.496.260 and in the European patent EP-0.916.963, are already known.

This latter document relates more especially to a multiplexer-demultiplexer in which the input and output fibers are positioned in the immediate vicinity of the focus of a concave mirror. Thus, divergent light received from the input are transformed by the concave mirror into parallel light beams which are directed to a plane diffraction network, i.e., grating, which sends the parallel beams back to the concave mirror and which focuses them on the ends of the output fibers.

We have endeavoured to reduce the aberrations and, especially, the spherical aberrations of such a system and it is thus that such a multiplexer-demultiplexer has been suggested, comprising a fiber carrier, an element carrying the diffraction network (i.e., grating), an intermediate element and a spherical mirror element. The fiber carrier puts the ends of the fibers in contact with the element carrying the diffraction network, the intermediate element which is in contact with the diffraction network and has the same optic index (i.e., refractive index) and the element which carries it, is terminated by a spherical surface in contact with the mirror.

This device is quite satisfactory, has enabled and still enables many embodiments.

However, in certain particular applications, the thermal instability generated by the index variation of the different elements which form the device, with the temperature and the variations of the properties, which may result, has proved detrimental.

SUMMARY OF THE INVENTION

The purpose of this invention is to avoid these shortcomings and hence to suggest a multiplexer-demultiplexer exhibiting the same advantages as that presented above, with a good thermal stability as well.

As a rule, the invention relates to a dispersion optic system for usage in a wavelength field of a light beam, comprising a plane network (i.e., grating) carried by a support with a dilatation coefficient $\epsilon$.

According to the invention, it contains a front index blade or first optical element of refractive index $n_1$, transparent in the wavelength field, one of the faces of which is parallel to the network plane (i.e., plane of the grating) and such that the variation of its optic index (i.e., refractive index) $n_1$ with temperature, $\epsilon + 1/n_1 \times dn_1/dt$ is small.

According to various embodiments each exhibiting their particular advantages and liable to be used in all their technically possible combinations:

- $dn_1/dt$ and $e$ are of opposite signs;
- the other face of the front blade (or first optical element) is perpendicular to the axis x, x' of the beam,
- the network support (i.e., grating support) is made of low dilatation silica and the refractive index $n_1$ of the first optical element is such that $dn_1/dt<0$,
- the first optical element of refractive index $n_1$ is made of BK7 (i.e., boro silicate crown glass),
- the first optical element of refractive index $n_1$ is made of SF64A (i.e., dense flint glass),
- the first optical element of refractive index $n_1$ is made of SK16 (i.e., dense barium crown glass),
- the first optical element of refractive index $n_1$ is made of LF5 (i.e., light flint glass),
- the first optical element is stuck on the grating using a flexible optic glue,
- the system comprises a second optical element made of a material with a dilatation coefficient close to that of the grating, with faces parallel to one another and to the grating, and located between the first optical element and the grating,
- the second optical element is made of the same material as the support of the grating.

This arrangement constitutes advantageously a multiplexer-demultiplexer or a fiber optic wavelength router comprising the grating, the support, the first optical element and a reflecting system, itself containing a mirror and an optic transmission system. The reflecting system exhibits a focus, whereas the ends of the input and output optic fibers are situated close to the focus. The optic transmission system comprises a first block carrying the mirror and of refractive index $n_3$, a second block with parallel faces of refractive index $n_4$ and a third block with parallel faces of refractive index $n_5$.

Advantageously, the first, second and third blocks are each made of pure silicia.

The second and the third blocks are made of a single piece.

BRIEF DESCRIPTION OF THE DRAWINGS

The invention will be described thereafter in detail with reference to the appended drawings in which.

DESCRIPTION OF THE PREFERRED EMBODIMENT

It has been noticed that the dispersing devices fitted with a grating and, especially, with a plane grating, are sensitive to thermal variations which may modify their properties and affect their performances.

In order to avoid these shortcomings, the procedure had consisted until now in stabilizing the temperature of these devices, which generates cost, volume and space requirements constraints which are rather significant.

So, to avoid these shortcomings, we suggest here to use a grating based on a low dilatation silica support. More generally, we shall use a grating for the implementation of the invention on a material with a low expansion or dilatation coefficient $\epsilon$, associated with a first optical element whose refractive index variation in relation to temperature $dn_1/dt$ is also small.

Temperature variations produce two distinct effects on the optic dispersing system of the invention.

An increase in temperature of the grating support causes its dilatation and hence the increase in the a-pitch of the grating.

On the other hand, the variation $dn_1/dt$ of the refractive index $n_1$ of the first optical element 3, in relation to temperature, modifies these refractive properties.

We have shown that it was possible to reduce this variation of the properties of the optic dispersing system while reducing the quantity $\epsilon+1n_1\times dn_1/dt$.

As a rule, this can be performed by reducing each of these quantities: $\epsilon$ on the one hand and $dn/dt$ or $1/n_1\times dn_1/dt$ on the other, whereas their sum is also relatively small.

It is also possible to select materials whose dilatation coefficient 8 on the one hand and the refractive index variations in relation to the temperature $dn_1/dt$ are of opposite signs.

We then obtain quite a small sum $\epsilon+1/n_1\times dn/dt$.

With a support 2 of the grating 1 made of silica, preferably chosen to show a small dilatation $\epsilon$, we can use for the construction of the first optical element 3, one of the glasses with a refractive index variation in relation to temperature as low as, for instance, the BK7, SF64A, SK16 or LF5 glasses.

Figure 2:
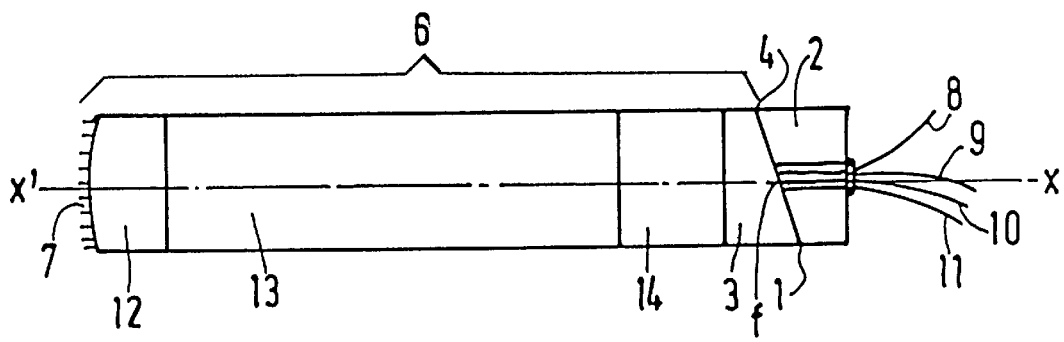
FIG. 2 is a diagrammatical representation of a multiplexer-demultiplexer performed according to a first embodiment of the invention.

These designations are those used by the SCHOTT Company. Obviously, materials exhibiting the same properties (i.e., boro silicate crown, dense flint, dense barium crown and light flint glasses) and produced by other companies under other denominations can also be used to this end. There are agreement tables enabling to identify easily the references and denominations used by the various manufacturers.

mm. As shown in FIG. 2, the optical element 3 is stuck on the grating 1 using a flexible optic glue 4. The multiplexer-demultiplexer or fiber optic wavelength router of FIG. 2 includes the grating 1, support 2, and optical element 3. A reflecting system 6 includes a mirror 7 and an optic transmission system 12, 13, 14. The reflecting system 6 has a focus f. Ends of input 8 and output 9, 10, 11 optic fibers are situated close to the focus f. The optic transmission system includes first block 12 carrying the mirror 7 and having a refractive index $n_3$, a second block 13 with parallel faces and having a refractive index $n_4$ and a third block 14 having parallel faces and a refractive index $n_5$. The first, second and third blocks 12, 13, 14 are made of pure silicia. The second block 13 and third block 14 are made of a single piece of material.

Figure 3:
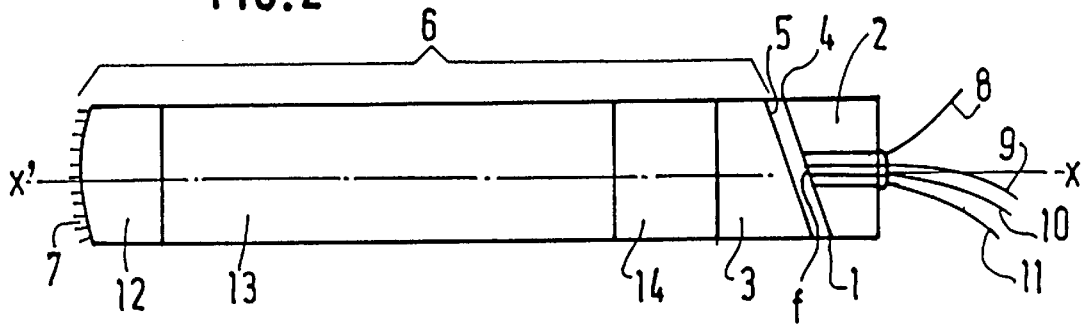
FIG. 3 is a diagrammatical representation of a multiplexer-demultiplexer performed according to a second embodiment of the invention.

FIG. 3 is the same as FIG. 2 with the addition of a second optical element 5 made of a material with a dilatation coefficient close to that of the grating and with faces parallel to one another and to the grating. The second optical element 5 is located between the grating 1 and the first optical element 3. The second optical element 5 is made of the same material as the support 2 of the grating 1.

We have used a grating of 600 dashes per millimeter and, except for the first optical element, the other elements, the blocks 12, 13 and 14, as well as the grating support, have been manufactured of pure silica, with dilatation coefficient $\epsilon$ of $5.2\times10^{-7}$ K$^{-1}$ ranging from 5 to 35° C.

The various first optical elements which have been experimented, are specified in the following table:

| Front Optical Element | Example 1 | Example 2 | Example 3 | Example 4 | Example 5 | Example 6 | Example 7 |
|---|---|---|---|---|---|---|---|
| Material | Bak2 | SF64A | LF5 | BK7 | BaK2 | LF5 | LF5 |
| Refraction index | 1.5237 | 1.6817 | 1.56594 | 1.50056 | 1.52307 | 1.55951 | 1.56010 |
| $1/n_1 \times dn_1/dt$ | (at $\lambda$ = 1540 nm) $\approx-3.5\ 10^{-7}$ | (at $\lambda$ = 1.06 μm) $\approx-3.2\ 10^{-7}$ | (at $\lambda$ = 1.06 μm) $-4.4\ 10^{-7}$ | (at $\lambda$ = 1557 μm) $+5.7\ 10^{-7}$ | (at $\lambda$ = 1.6 μm) $-3.5\ 10^{-7}$ | (at $\lambda$ = 1.55 μm) $-5.34\ 10^{-7}$ (at 25° C.) | (at $\lambda$ = 1.50 μm) $-5.27\ 10^{-7}$ (at 25° C.) |

When $\epsilon$ is positive and the $dn_1/dt$ variations are negative, as for the BaK2, LF5, SF64A glasses, the results obtained are especially good.

Figure 1:
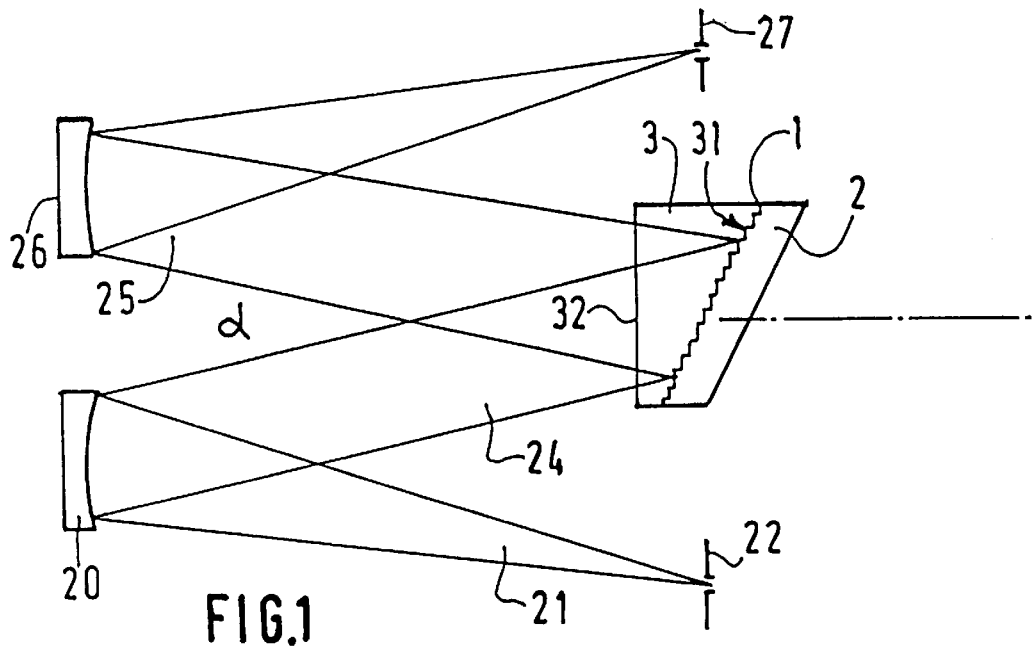
FIG. 1 is a diagrammatical representation of a spectrometer implementing the optic system of the invention.

The first embodiment is the general one of a spectrometer such as represented in FIG. 1. The network or grating 1, which is carried by the support 2, receives an input light beam 21 from an input slot 22, when placed at the focus of an optic system 20, which produces a parallel beam 24. By dispersion, the grating 1 returns a parallel beam 25 via an optic system 26 to an output slot 27 selecting a particular wavelength in relation to its position in its own plane.

The front blade or first optical element 3 comprises a face 31 which is parallel to the plane of the grating 1 and a second face 32, which is perpendicular to the system axis, and more or less perpendicular in the actual embodiments, to the incident beam 24 and to the reflected beam 25 at the same time. Indeed, for clarity purposes, the beams 24 and 25 have been represented in FIG. 1 as forming quite a significant angle α. In the embodiments, this angle is small, enabling the condition specified above to be fulfilled.

This arrangement has enabled different embodiments in which we could obtain a multiplexer-demultiplexer such as represented in FIG. 2, with a total output of approximately 100 mm and a curvature radius of the spherical mirror of 239

Thus, we obtain for these examples, a value for the expression $\epsilon+1/n_1\times dn_1/dt$ which is low and vastly inferior to that we would get by using components which would all be made of the same material, for example silica.

I claim:

1. An optic dispersing system, designed for usage in a wavelength field of a beam, comprising:
    a grating formed on a support having a dilatation coefficient $\epsilon$ which is low;
    a first optical element having two faces, and having a refractive index $n_1$, transparent in the wavelength field, one of the faces being parallel to a plane of the grating and a variation of the refrative index $n_1$ with temperature, $1/n_1\times dn_1/dt$ is small and opposite in effect to the dilatation coefficient $\epsilon$ of the support, wherein a temperature dependency of said optic dispensing system is equal to $\epsilon+1n_1\times dn_1/dt$ and is minimized.

2. An optic system according to claim 1, wherein $dn_1/dt$ and $\epsilon$ are of opposite signs.

3. An optic system according to claim 1, wherein the other face of the first optical element is perpendicular to an axis of the beam.

4. An optic system according to claim 1, wherein the support of the grating is made of low dilatation silica and the refractive index $n_1$ of the first optical element is such that $dn_1/dt<0$.

5. An optic system according to claim 1, wherein the first optical element of refractive index $n_1$ is made of boro silicate crown glass.

6. An optic system according to claim 1, wherein the first optical element of refractive index $n_1$ is made of dense flint glass.

7. An optic system according to claim 1, wherein the first optical element of refractive index $n_1$ is made of dense barium crown glass.

8. An optic system according to claim 1, wherein the first optical element of refractive index $n_1$ is made of light flint glass.

9. An optic system according to claim 1, wherein the first optical element is stuck on the grating using a flexible optic glue.

10. An optic system according to claim 1, further comprising a second optical element made of a material with a dilatation coefficient close to that of the grating, with faces parallel to one another and to the grating, and located between the first optical element and the grating.

11. An optic system according to claim 10, wherein the second optical element is made of the same material as the support of the grating.

12. An optic system according to claim 1 or 10, wherein it constitutes a multiplexer-demultiplexer or a fiber optic wavelength router comprising the first optical element and a reflecting system, containing a mirror and an optic transmission system, wherein said reflecting system exhibiting a focus, the ends of input and output optic fibers are situated close to the focus, wherein the optic transmission system comprises a first block carrying the mirror and of refractive index $n_3$, a second block with parallel faces of refractive index $n_4$, and a third block with parallel faces of index $n_5$.

13. An optic system according to claim 12, wherein the first block is made of pure silica.

14. An optic system according to claim 13, wherein the second block is made of pure silica.

15. An optic system according to claim 14, wherein the third block is made of pure silica.

16. An optic system according to claim 13, wherein the third block is made of pure silica.

17. An optic system according to claim 13, wherein the second block and the third block are made of a single piece.

18. An optic system according to claim 12, wherein the second block is made of pure silica.

19. An optic system according to claim 18, wherein the third block is made of pure silica.

20. An optic system according to claim 12 wherein the third block is made of pure silica.

21. An optic system according to claim 12, wherein the second block and the third block are made of a single piece.

* * * * *